United States Patent [19]

Murabayashi

[11] Patent Number: 5,684,648
[45] Date of Patent: Nov. 4, 1997

[54] DIGITAL SIGNAL RECORDING APPARATUS WITH MEANS FOR DETECTING AN ID SIGNAL AND CONTROLLING THE NUMBER OF SIGNAL SAMPLES

[75] Inventor: Noboru Murabayashi, Saitama, Japan

[73] Assignee: Sony Corporation, Tokyo, Japan

[21] Appl. No.: 434,053

[22] Filed: May 3, 1995

[30] Foreign Application Priority Data

May 12, 1994 [JP] Japan ..................................... 6-122996

[51] Int. Cl.$^6$ ..................................... G11B 5/07
[52] U.S. Cl. ..................................... 360/39; 360/69; 386/96
[58] Field of Search ..................................... 360/19.1, 13, 27, 360/39, 46, 51, 53, 65, 68, 77.14, 10.2, 24, 25, 18, 48, 69; 386/56, 39, 96, 104, 33, 101, 27

[56] References Cited

U.S. PATENT DOCUMENTS 5,396,374  3/1995  Kubota et al. ..................... 360/27
5,426,538  6/1995  Kanota et al. ..................... 360/48

FOREIGN PATENT DOCUMENTS 561281  9/1993  European Pat. Off. .

Primary Examiner—Aristotelis M. Psitos
Assistant Examiner—Patrick Wamsley
Attorney, Agent, or Firm—William S. Frommer; Alvin Sinderbrand

[57] ABSTRACT

Even if data is recorded on a recording medium on which another data has been recorded, no problem takes place. Data that has been recorded on a recording medium is read. A reproduction signal processing portion 26 extracts an ID signal that identifies the number of samples of the data. The extracted ID signal is supplied to a record signal processing portion 39 and a fs clock generating PLL portion. The fs clock generating PLL portion 33 generates a clock corresponding to the supplied ID signal. A sound (audio) signal is sampled corresponding to the generated clock. The sampled signal is supplied to the record signal processing portion 39 along with the ID signal supplied from the record signal processing portion 39 and the number of samples represented by the ID signal to an after-record region.

6 Claims, 10 Drawing Sheets

Fig. 4

| | BA 1 | BA 2 | BA 3 | BA 4 | BA 5 | | BA10 | BA11 | BA12 | BA13 | BA14 |
|---|---|---|---|---|---|---|---|---|---|---|---|
| SA 1 | ID0 | | | | | | | | | | |
| 2 | ID1 | | | | | | | | | | |
| 3 | | | | | | | | | | | |
| 4 | | | | | | | | | | | |
| 5 | | | | | | | | | | | |
| 6 | | | | | | | | | | | |
| 7 | | | | | E/D ID | | | | | | E/D ID |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | L0 u | L10 u | L20 u | L30 u | L40 u | | L5 u | L15 u | L25 u | L35 u | L45 u |
| 14 | l | l | l | l | l | | l | l | l | l | l |
| 15 | L50 u | L60 u | L70 u | L80 u | L90 u | | L55 u | L65 u | L75 u | L85 u | L95 u |
| 16 | l | l | l | l | l | | l | l | l | l | l |
| 17 | L100 u | L110 u | L120 u | L130 u | L140 u | | L105 u | L115 u | L125 u | L135 u | L145 u |
| 18 | l | l | l | l | l | | l | l | l | l | l |
| 19 | L150 u | L160 u | L170 u | L180 u | L190 u | | L155 u | L165 u | L175 u | L185 u | L195 u |
| 20 | l | l | l | l | l | | l | l | l | l | l |
| 21 | L200 u | L210 u | L220 u | L230 u | L240 u | | L205 u | L215 u | L225 u | L235 u | L245 u |
| 22 | l | l | l | l | l | | l | l | l | l | l |
| 23 | L250 u | L260 u | L270 u | L280 u | L290 u | | L255 u | L265 u | L275 u | L285 u | L295 u |
| 24 | l | l | l | l | l | | l | l | l | l | l |
| 73 | L1500 u | L1510 u | L1520 u | L1530 u | L1540 u | | L1505 u | L1515 u | L1525 u | L1535 u | L1545 u |
| 74 | l | l | l | l | l | | l | l | l | l | l |
| 75 | L1550 u | L1560 u | L1570 u | L1580 u | L1590 u | | L1555 u | L1565 u | L1575 u | L1585 u | L1595 u |
| 76 | l | l | l | l | l | | l | l | l | l | l |
| 77 | L1600 u | L1610 u | L1620 u | L1630 u | L1640 u | | L1605 u | L1615 u | L1625 u | L1635 u | L1645 u |
| 78 | l | l | l | l | l | | l | l | l | l | l |
| 79 | L1650 u | L1660 u | L1670 u | L1680 u | L1690 u | | L1655 u | L1665 u | L1675 u | L1685 u | L1695 u |
| 80 | l | l | l | l | l | | l | l | l | l | l |

Fig. 5

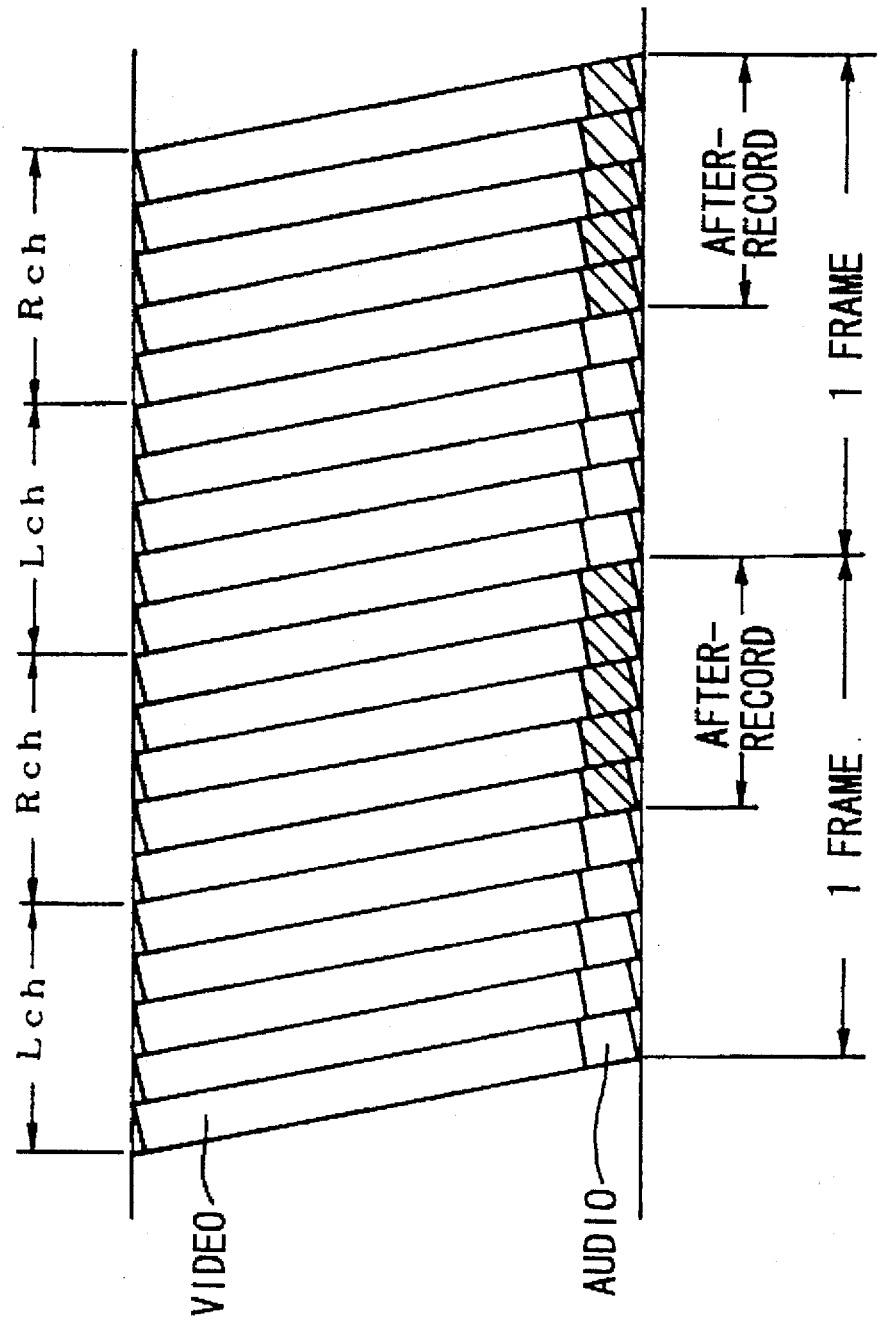

DIGITAL SIGNAL RECORDING APPARATUS WITH MEANS FOR DETECTING AN ID SIGNAL AND CONTROLLING THE NUMBER OF SIGNAL SAMPLES

BACKGROUND OF THE INVENTION

1. Field of the Invention

The present invention relates to a digital signal recording apparatus for recording, for example, an audio PCM signal on a magnetic recording medium through a rotating magnetic head.

2. Description of the Related Art

When an audio PCM signal is recorded as a sound signal by a digital signal recording apparatus, if the ratio of the sampling frequency fs to the internal interleave reference signal frequency is not an integer, an image signal and an audio PCM signal are synchronized so that they are properly recorded and reproduced. It is assumed that the audio PCM signal is interleaved in a frame and the sampling frequency fs is 48 kHz. In this case, the frame frequency is 29.97 Hz. Thus, the ratio of these signals is represented as follows.

$$48000/29.97 = 1601.6 \quad (1)$$

Consequently, the ratio of these signals is not an integer.

As an integer that is closest to the quotient, it is assumed that 1602 is designated as the standard number of samples of data recorded at one interleave region. In addition, two numbers of samples numbers, for example 1592 and 1612, are designated as a smaller number and a larger number of the standard number of samples, respectively. The number of samples of the audio PCM signal to be recorded is measured. The cumulative value of the number of samples and the cumulative value of one selected from the designated numbers of sampled are compared in frame frequencies.

When the cumulative value of the number of samples is larger than the cumulative value of the designated value, 1612 is selected. In contrast, when the cumulative value of the number of samples is smaller than the cumulative value of the designated value, 1592 is selected. The selected number of samples are recorded on a recording medium as data for one frame. In addition, an identification signal that represents the number of samples of record data is recorded.

When the sampling frequency fs is 32 kHz, the ratio of the sampling frequency to the frame frequency is represented as follows.

$$32000/29.97 = 1067.6 \quad (2)$$

Thus, the ratio of these frequencies is not an integer. It is assumed that an integer 1068 that is closest to the quotient is designated as the standard number of samples of data recorded at one interleave region. When two sample numbers 1058 and 1078 are designated as a lower number and a larger number of the standard number of samples, respectively, the above-described sampling frequency fs can be recorded in a similar manner to the case of 48 kHz.

In the above description, it is assumed that two numbers of samples are designated as a lower number and a larger number of the standard number of samples. However, it should be noted that the numbers of sample numbers may be two or more. For example, when the numbers of samples is four, if the sampling frequency fs is 48 kHz, 1622, 1612, 1592, and 1582 may be designated.

When the sampling frequency fs is 32 kHz, four numbers of samples 1088, 1078, 1058, and 1048 may be designated.

When more numbers of samples are designated, the above described cumulative values can be more precisely controlled.

Thus, even if the number of samples for one frame is an integer, the number of samples that is close to the above-described standard number of samples is averagely recorded. Thus, asynchronization between the image signal and the audio PCM signal can be prevented. When signals are reproduced, the identification signal extracted from the reproduction signal is cumulated. Thereafter, the phase of the cumulative value is compared with the phase of the cumulative value of the sampling clock formed in PLL (Phase Locked Loop). The compared output is supplied to a VCO (voltage controlled oscillator) of the PLL. Thus, as with the case in the recording mode, the relation between the interleave reference signal and the sampling clock is maintained in the reproducing state, thereby correctly reproducing digital signals.

It is noted that the prior art related to the above-mentioned technique is disclosed in EP laid-open publication No. 561,281 by the same applicant (filing date: Mar. 11, 1993, Application number: 93103963.0 corresponding U.S. application is pending).

When the sampling frequency fs and the number of quantizing bits Qu are decreased, the number of channels that can be independently recorded can be increased. Now, it is assumed that half the channels are after-recorded. When the sampling frequency fs is 48 kHz, the number of quantizing bits is 16, and the number of channels is 2, the transmission rate of digital data on two channels is represented as follows.

$$48000 \times 16 \times 2 = 1.56 \text{ (Mbps)} \quad (3)$$

When the sampling frequency fs is 32 kHz, the number of quantizing bits Qu is 12, and the number of channels is 4, the transmission rate of digital data is represented as follows.

$$32000 \times 12 \times 4 = 1.536 \text{ (Mbps)} \quad (4)$$

Thus, these transmission rates in the above-described two cases are the same.

In other words, when the sampling frequency fs is 32 kHz, the number of quantizing bits Qu is 12, the number of channels is 4, and two channels are used during recording, the remaining two channels can be used for after-recording.

However, when after-recording is performed, if the above-described numbers of samples are controlled independently for after-recording from that of channels that have been recorded (i.e., not after-recorded), different identification signals are used. Thus, to reproduce such signals, two sets of signal reproducing portions are required.

Therefore, an object of the present invention is to provide a digital signal recording apparatus that can perform after-recording of a digital signal in which the ratio of the sampling frequency fs of a digital information signal to be recorded to the frequency of the internal interleave reference signal is not an integer without requiring a complicated signal reproducing portion.

SUMMARY OF THE INVENTION

A digital signal recording apparatus having a non-integer relation between a sampling frequency of a digital information signal to be recorded and an inner interleave reference signal frequency, comprising a sample number controlling means for controlling the number of samples at an interleave region so that the number of samples of data that has been recorded becomes equal to the number of samples of an information signal, when the after-recording is performed for the recording medium on which data has been recorded, and a recording means for pre-detecting an ID signal that identifies the number of samples at the interleave region from the recording medium and recording the ID signal to the recording medium along with the information signal that is after-recorded.

When after-recording is performed, an identification signal that represents the number of samples of a data portion that is not after-recorded is pre-detected. Corresponding to the identification signal, the sampling frequency fs of an information signal to be after-recorded is controlled. Thus, the number of samples that is equal to the number of samples of the data portion that is not after-recorded is recorded. Consequently, the reproduction signal processing portion can perform signal process with only one sampling clock control operation regardless of whether or not the after-recording is performed.

In addition, an ID signal for a pre-recorded data portion is detected. The same ID signal can be recorded in an after-record region along with an information signal to be after-recorded.

According to the present invention, the E/D ID is detected from the ID region of the data portion that has been recorded. The same E/D ID as the detected E/D ID can be recorded in the after-record region along with an information signal to be afterrecorded.

In addition, the fs clock generating PLL portion and the reproduction signal processing portion (for example, an identification signal detecting portion that represents the number of samples) can be constructed as one system.

Moreover, since the data sampling frequency controlling portion used for after-recording is constructed in common with the fs clock generating PLL portion, the apparatus can be simply constructed at low cost.

Furthermore, according to the present invention, although an audio PCM signal is used, still image data such as digital video can be recorded.

The above, and other, objects, features and advantages of the present invention will become readily apparent from the following detailed description thereof which is to be read in connection with the accompanying drawings.

BRIEF DESCRIPTION OF THE DRAWINGS

FIG. 4 is a schematic diagram showing an example of interleaving on a track according to the present invention;

FIG. 5 is a schematic diagram showing an example of interleaving among several tracks;

FIG. 6 is a schematic diagram showing an example of a record region of each signal of a magnetic tape pattern according to the present invention;

DETAILED DESCRIPTION OF THE PREFERRED EMBODIMENTS

Next, with reference to the accompanying drawings, an embodiment of the present invention will be described. The description will be made in the following order.

Figure 1:
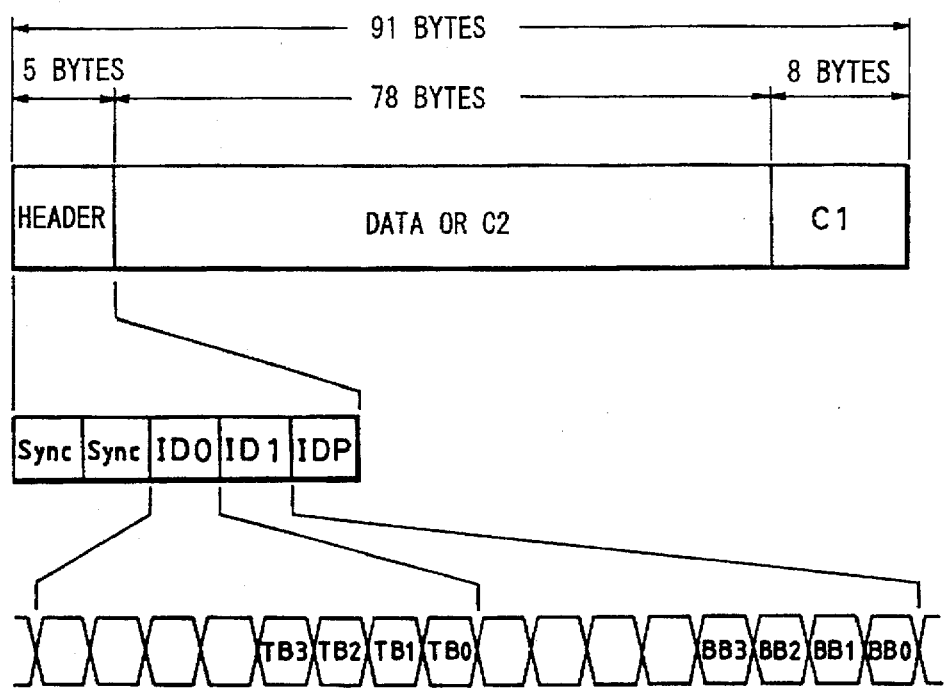
FIG. 1 is a schematic diagram showing an example of the structure of a block according to the present invention.

(1) Example of the structure of a block;
(2) Example of the structure of a track;
(3) Example of the structure of a frame;
(4) Example of interleaving on a track;
(5) Example of interleaving in several tracks;
(6) Record regions of signals on a magnetic tape according to present invention;
(7) Flow chart of a signal process of the digital signal recording apparatus according to present invention;
(8) Example of an entire block construction of the digital signal recording apparatus according to present invention;
(9) Example of a block construction of the recording portion;
(10) Example of a block construction of the sampling clock controlling portion; and
(1) Example of the structure of a block FIG. 1 is a conceptual schematic diagram showing an example of the structure of one block of record data. One block is composed of a header portion, a main data portion, and a C1 parity portion. The header portion is positioned at the beginning of the block and composed of a block sync (Sync)(two bytes), header IDs (ID0 and ID2)(two bytes), and a header ID parity (one byte). Thus, the header portion is composed of a total of five bytes. A track ID number (1 to 10) is stored in the low order four bits of the header ID0. A block ID number (1 to 14) is stored in the low order four bits of the header ID1.

The main data portion (hereinafter referred to as data portion) is composed of 78 bytes. Data and C2 parity are stored in the data portion. At the beginning of the data portion, there is a region in which an ID signal that identifies whether data recorded in a frame portion is an "E" data frame (an excess data frame) or a "D" data frame (a diminished data frame). The C1 parity portion is composed of eight bytes. Thus, one block is composed of 91 bytes.

(2) Example of the structure of a track

Figure 2:
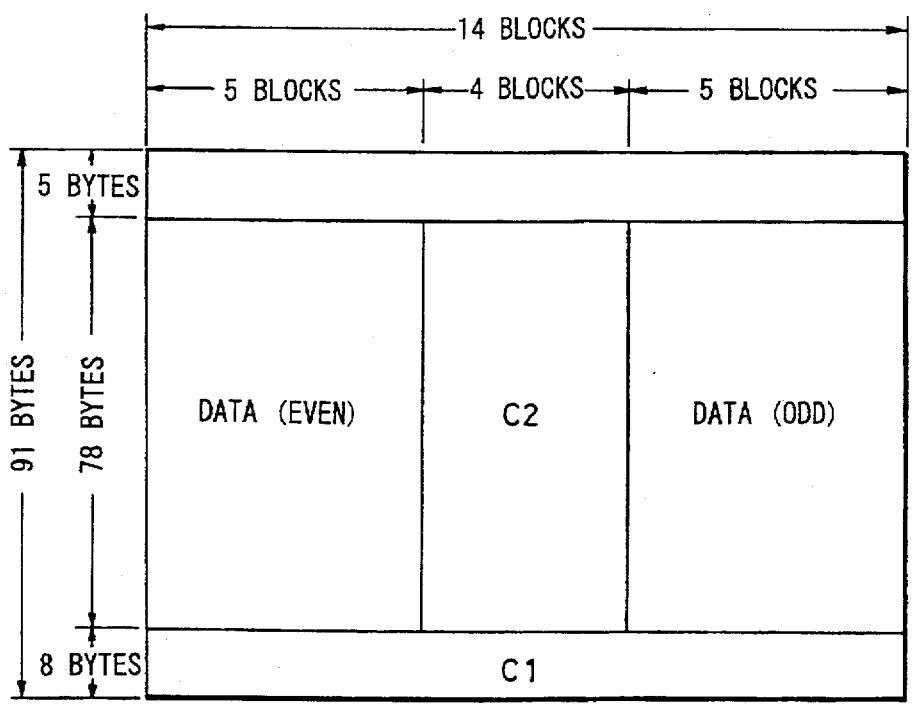
FIG. 2 is a schematic diagram showing an example of the structure of a track according to the present invention.

FIG. 2 is a conceptual schematic diagram showing an example of the data structure of one track. One track is composed of a first data portion (having five blocks), a C2 parity portion (having four blocks), and a second data portion (having five blocks). Thus, one track is composed of a total of 14 blocks.

Even number data on L (left) and R (right) channels are positioned in the data portion at addresses BA1 to 5 (hereinafter, referred to as an even number sequence). Odd number data on L and R channels are positioned in the data portion at addresses BA10 to 14 (hereinafter, referred to as an odd number sequence). A parity that is interleaved in the direction of block addresses BA is placed in position of the C2 parity portion at addresses BA6 to 9.

(3) Example of the structure of a frame

Figure 3A:
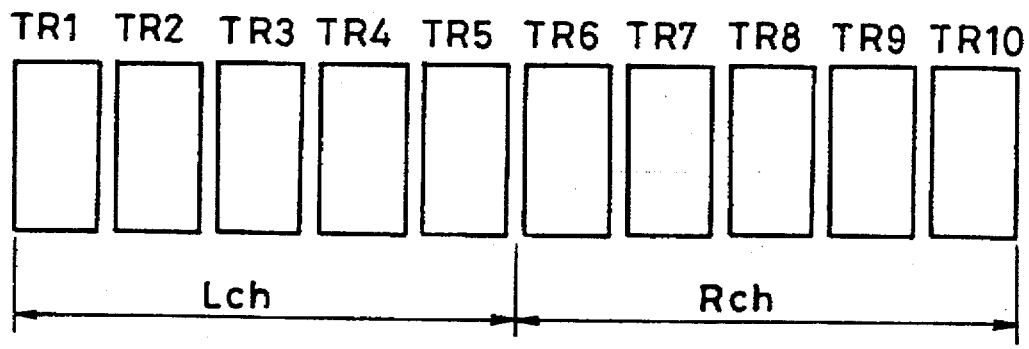
FIGS. 3A and 3B are schematic diagrams showing an example of the structure of a frame according to the present invention.
Figure 3B:
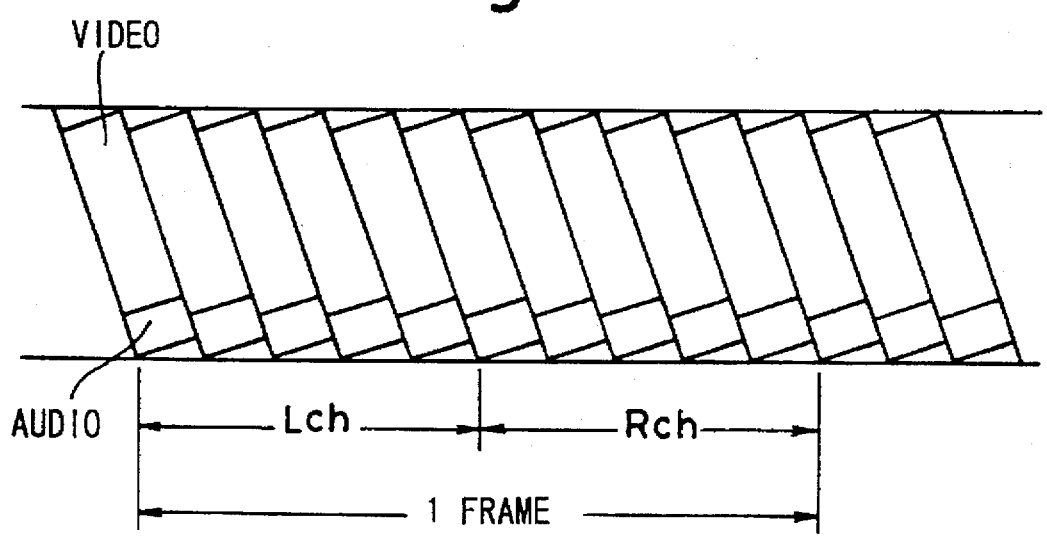

FIGS. 3A and 3B are conceptual schematic diagrams showing an example of the structure of data of one frame. As shown in FIG. 3A, one frame is composed of 10 tracks. Signals on the L channel are recorded on tracks TR1 to TR5. Signals on the R channel are recorded on tracks TR6 to TR10. As shown in FIG. 3B, these tracks are recorded on a magnetic tape.

(4) Example of interleaving on a track

FIG. 4 is a conceptual schematic diagram showing an example of interleaving of data recorded on a track. For simplicity, only track TR1 will be described. In FIG. 4, five blocks of the first data portion and five blocks of the second data portion are shown. Four blocks of the C2 parity portion are omitted. As described above, data on the L channel is stored in track TR1. The regions surrounded by solid lines represent ID regions. In each of the ID regions, E/D ID, sampling frequency fs, number of quantizing bit Qu, and so forth are written.

In FIG. 4, the vertical direction and the horizontal direction are defined as the symbol address SA direction and the block address BA direction, respectively. With respect to data L0, the data sequence in the symbol address SA direction is L0, LS0, L100, L150, L200, ..., and so on. Thus, the interleave length in the symbol address SA direction is 50 samples.

Likewise, with respect to data L0, the data sequence in the block address BA direction is L0, L10, L20, L30, L40, ..., and so on. Thus, the interleave length in the block address BA direction is 10 samples. The interleave lengths in the symbol address SA direction and in the block address BA direction are the same as those of data of even number sequence, odd number sequence, and other track TR data.

Now, as described above, it is assumed that the standard number of samples is 1602 and that the numbers of samples of IDs (f1, f2) of two bits are represented as follows.

(0, 0) : 1582 (number of D2 data)
(0, 1) : 1592 (number of D1 data)
(1, 0) : 1612 (number of E1 data)
(1, 1) : 1622 (number of E2 data)

When the frequency of the reference signal that is recorded is the same as the frequency of the reference signal that is reproduced, it is not necessary to designate the number of samples other than the standard number of samples. However, when a digital interface input is considered, the sampling frequency may deviate up to ±1000 ppm. Thus, the number of samples should be designated so that it can absorb such deviation. When the sampling frequency fs is 48 kHz, the deviation of ±1000 ppm becomes 48.048 kHz (+1000 ppm) to 47.952 kHz (−1000 ppm). Thus, the number of samples should be designated with proper tolerance.

Now, it is assumed that the standard number of samples is 1602, the number of E data is 1612, and the number of D data is 1592. In this case, when the frequency of the reference signal is 29.97 Hz, the sampling frequency fs of the number of E data is represented as follows.

29.97 (Hz)×1612=48.31 (kHz)>48.048 (kHz).

The sampling frequency fs of the number of D data is represented as follows.

29.97 (Hz)×1592=47.71 (kHz)<47.952 (kHz).

Thus, the deviation of ±1000 ppm can be absorbed.

Individual data are interleaved and written to corresponding tracks. At this point, in non-data regions, null data (00H) is written. Regions at BA5 and SA7 and at BA14 and SA7, an ID signal generated by an E/D ID generating circuit (that will be described later) is written.

(5) Example of interleaving among several tracks

Figure 5:
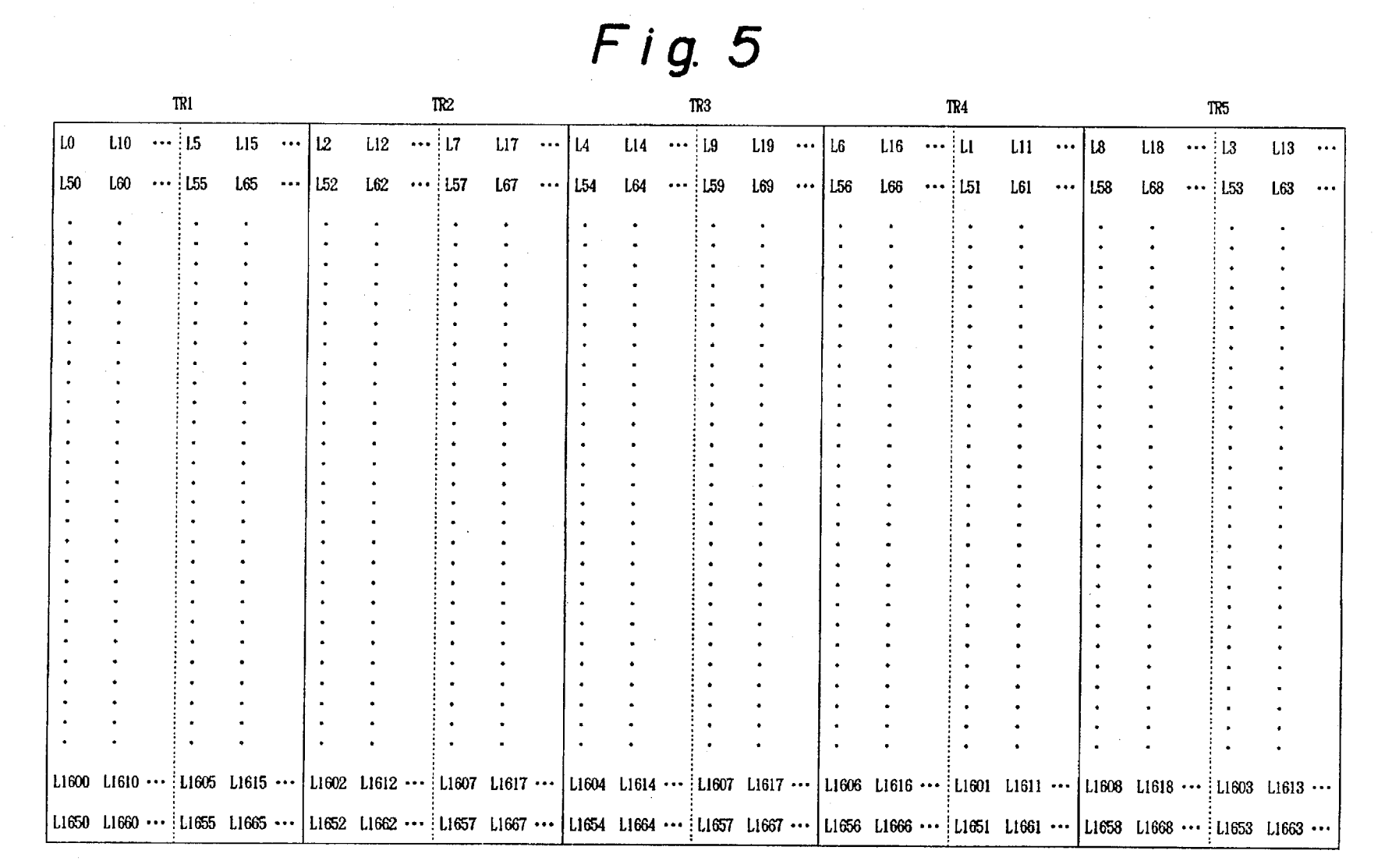

FIG. 5 is a conceptual view showing an example of interleaving of data recorded among several tracks. With respect to data L0 of the even number sequence on track TR1, the data sequence on the tracks is L0, L2, L4, L6, L8, ..., and so on. Thus, the interleave length between each track is two samples.

With respect to data LS of the odd number sequence on track TR1, the data sequence on tracks is L5, L7, L9, L1, L3, ..., and so on. Thus, the data L9 is followed by the data L1. However, when the concept of remainder is employed, the interleave length between each track is two samples. Thus, it is clear that data are regularly interleaved.

(6) Record regions of signals on magnetic tape according to the present invention.

FIG. 6 is a conceptual schematic diagram showing record regions of signals on a magnetic tape according to the present invention. As with the case shown in FIG. 3, one frame is composed of 10 tracks. One track is composed of an image signal record region Video and a sound signal record region Audio. Tracks TR1 to 5 on L channel represent recorded regions. Tracks TR6 to 10 on R channel (hatched portions) represent regions in which data can be after-recorded (hereinafter, these regions are referred to as after record regions).

Figure 7A:
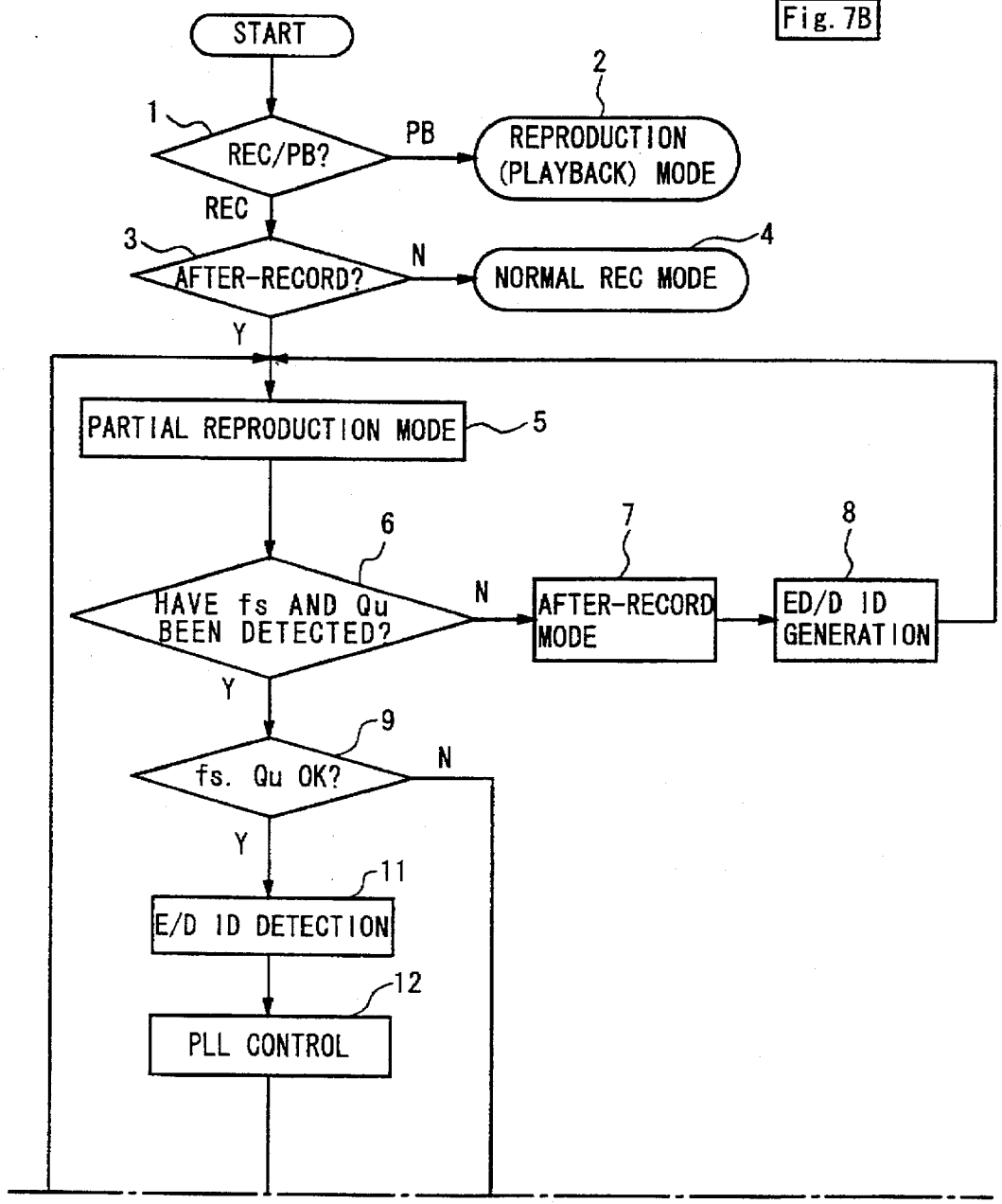
FIGS. 7A and 7B are flow charts showing an example of a signal process of a digital signal recording apparatus according to the present invention.
Figure 7B:
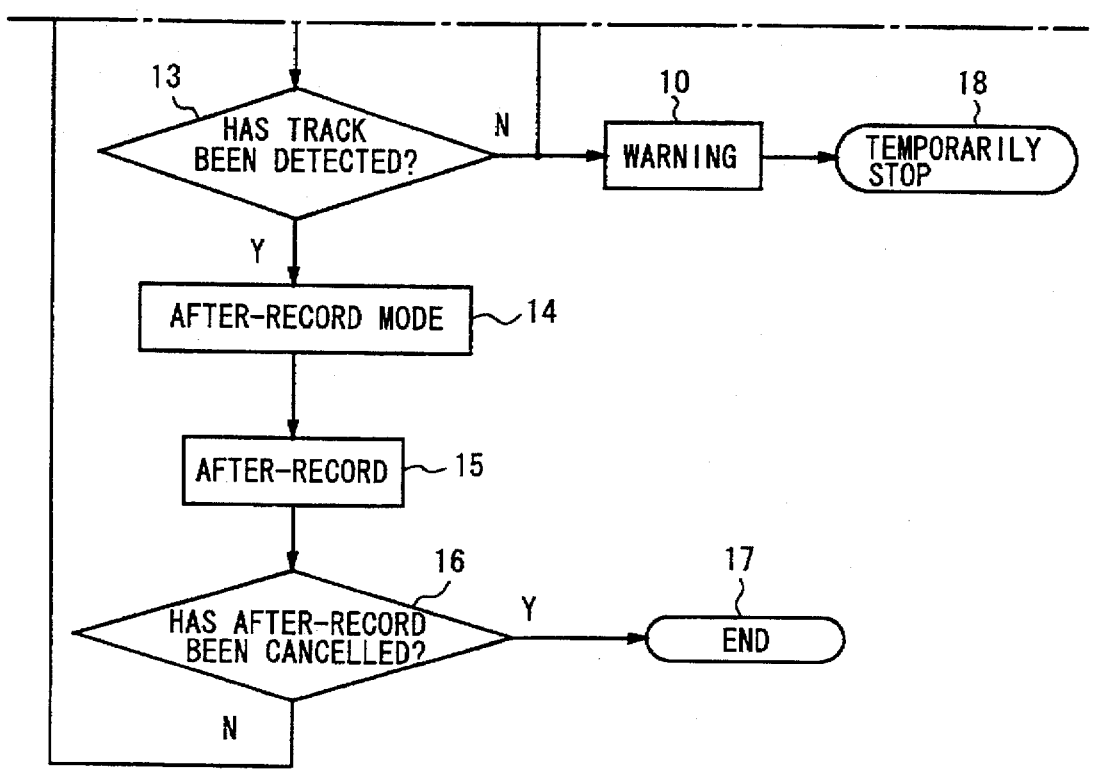

(7) Flow chart of signal process of digital signal recording apparatus according to the present invention FIGS. 7A and 7B are flow charts showing a signal process of a digital signal recording apparatus according to the present invention. At step 1 "REC/PB", it is determined whether the present mode is record mode or reproduction (playback) mode. When the determined result is the reproduction mode, the flow advances to step 2. At step 2, the apparatus is controlled corresponding to a flow chart (not shown) for the reproduction mode. When the determined result is the record mode, the flow advances to step 3. At step 3, it is determined whether or not to perform after-recording.

When the determined result is the normal record mode, the flow advances to step 4. At step 4, the apparatus is controlled to operate in the record mode in a manner known in the art. When the determined result at step 3 is to perform in the after-record mode, the flow advances to step 5 "partial reproduction mode". In the partial reproduction mode, all or part of the data on tracks TR1 to 5 is reproduced. At step 6, the sampling frequency fs and the number of quantizing bits Qu in the after-record region are detected. When the sampling frequency fs and the number of quantizing bits Qu are not detected, it is determined that no data has been recorded in the after-record region (tracks TR6 to 10). In this case, the flow advances to step 7 "after-record mode". At step 8, an E/D ID is generated and data is recorded in the after-record region.

When the sampling frequency fs and the number of quantizing bits Qu are detected from a partially reproduced region at step 6, the flow advances to step 9. At step 9, it is determined whether or not the detected sampling frequency fs and the number of quantizing bits Qu are predetermined values (fs=32 kHz and Qu=12 bits). When the sampling frequency fs and the number of quantizing bits Qu are different from the predetermined values, the after-recording is not performed. In this case, the flow advances to step 10 "warning". At step 10, a warning that represents that the after-recording cannot be performed is displayed. Thereafter, the flow advances to step 18. At step 18, the after-record mode is temporarily stopped.

When the determined result at step 9 is YES (the sampling frequency fs and the number of quantizing bits Qu are the predetermined values), the flow advances to step 11. At step 11, an E/D ID of a record region that is not an after-record region is detected. The fs clock generating PLL frequency dividing portion is controlled corresponding to the detected E/D ID. At step 11, a clock generated by a fixed crystal oscillator is used. On the other hand, at step 12, a generated clock is used. At step 13, it is determined whether or not to detect the R channel that is an after-record region (namely, tracks TR6 to 10).

When the determined result at step 13 is NO (tracks TR6 to 10 cannot be detected), the flow advances to step 10. As with the above-described case, the after-record mode is temporarily stopped. When the determined result at step 13 is YES (tracks TR6 to 10 that are after-record regions can be detected), the flow advances to step 14. At step 14, the apparatus enters the after-record mode. In addition, the sampling frequency fs and the number of quantizing bits Qu are designated as the predetermined values (fs=32 kHz and Qu 12 bits). Thereafter, the flow advances to step 15.

At step 15 "after-record", data is after-recorded on tracks TR6 to 10 in the after-record regions. At step 16, it is determined whether or not a system controller has issued an after-record stop command. When the determined result at step 16 is YES (the after-record stop command has been sent), the flow advances to step 17. At step 17, the after-recording is cancelled. Thus, the process of the flow chart is finished. When the determined result at step 16 is NO (the stop command has not been sent), the flow returns to step S. At step 5, it is determined whether or not to continue the after-recording. Thus, the process of the flow chart is continued.

Figure 8:
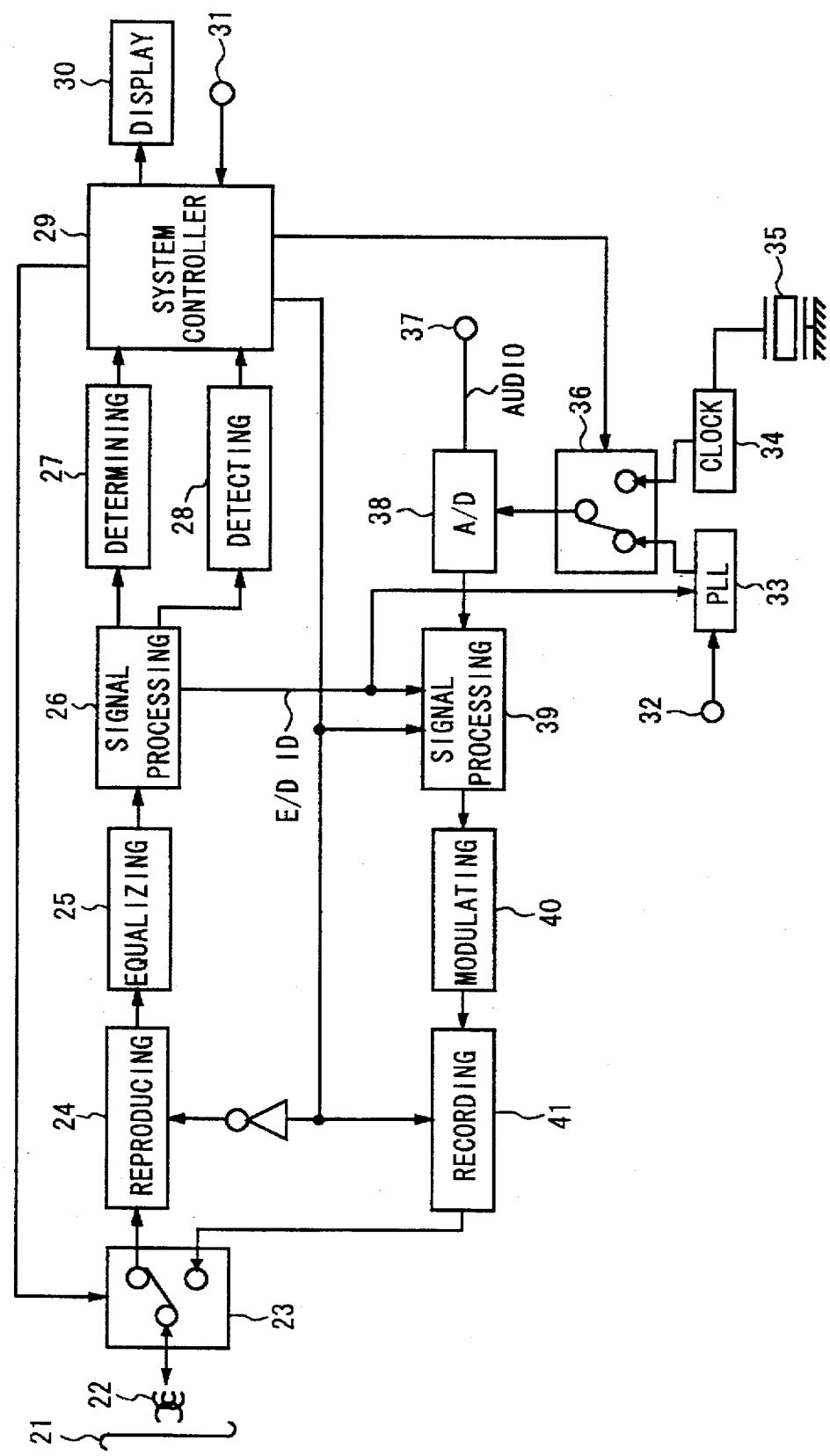
FIG. 8 is a block diagram showing a digital signal recording apparatus according to an embodiment of the present invention.

(8) Example of entire block construction of digital signal recording apparatus according to the present invention Next, an example of the entire block construction of a digital signal recording apparatus according to the present invention will be described. FIG. 8 shows the entire block construction of the digital signal recording apparatus according to the present invention. In the following description, it is assumed that signals are recorded in record regions in the same way as shown in FIG. 6. Data is recorded in the predetermined record pattern shown in FIG. 6 (sampling frequency fs=32 kHz and the number of quantizing bits Qu=12 bits). The record mode can be determined by detecting an identification signal placed in an ID region of the data portion.

When an after-record mode command is supplied from a terminal 31 to a system controller 29, as shown in the flow chart for the signal process, the apparatus enters the partial reproduction mode. Data recorded on a magnetic tape 21 is reproduced through a magnetic head 22. At this point, since a magnetic head selecting switch 23 is placed in a reproduction position, reproduced data (hereinafter referred to as reproduction data) is amplified by a reproducing amplifier 24. The reproduction data is supplied to a reproduction equalizing portion 25. The reproduction equalizing portion 25 equalizes the reproduction data. The equalized data is supplied to a reproduction signal processing portion 26. The reproduction signal processing portion 26 performs signal processes such as synchronous signal detection and error correction. Thereafter, the sampling frequency fs, the number of quantizing bits Qu, and so forth are detected.

The detected sampling frequency fs and the number of quantizing bits Qu are supplied from the reproduction signal processing portion 26 to an after-record mode determining portion 27. The determined result is supplied to the system controller 29. When the sampling frequency fs and the number of quantizing bits Qu are the predetermined values (sampling frequency fs=32 kHz and number of quantizing bits Qu=12 bits), after-recording can be performed. The reproduction signal processing portion 26 detects an E/D ID.

The detected E/D ID is input from the reproduction signal processing portion 26 to an fs clock generating PLL portion 33 so as to control a frequency divider. At this point, an audio PCM signal (Audio) that is supplied to an A/D converting portion 38 through a terminal 37 is controlled so that the same number of samples as the data portion in which the after-recording is not performed are recorded. A synchronous signal is supplied from the reproduction signal processing portion 26 to a track number detecting portion 28. The track number detecting portion 28 determines whether or not to detect tracks TR6 to 10. The result is supplied to the system controller 29.

The E/D ID generated in the reproduction signal processing portion 26 is sent to a record signal processing portion 39. The E/D ID is recorded along with the data. When the sampling frequency fs and the number of quantizing bits Qu cannot be detected in the after-record enable state, the E/D ID generated in an E/D ID generating portion 53 (FIG. 9) of the record signal processing portion 39 is recorded along with the data. At this point, a switch 36 is switched so that the fs clock oscillated by a crystal oscillator 35 rather than the fs clock generation PLL portion 33 is used and thus the operation of the A/D converting portion 38 is performed.

When the after-record mode command is input from the terminal 31 to the system controller 29, if the after-recording operation cannot be performed, a warning alarm displaying portion 30 that represents that the after-recording cannot be performed displays a warning and the after-recording is temporarily stopped. When the record signal processing portion 39 detects tracks TR6 to 10 in the after-record region, the magnetic head selecting switch 23 is placed to the record mode position. Thus, the output signal of the record signal processing portion 39 is supplied to a modulating portion 40. The modulating portion 40 modulates the input signal corresponding to high density magnetic recording and sends the modulated signal to a recording amplifier 41. The amplified signal is recorded on the magnetic tape 21.

When data has been recorded on tracks TR6 to 10 (namely, data has been recorded in an after-record region), the system controller 29 sends a record end signal to the reproducing amplifier 24, the record signal processing portion 39, and the recording amplifier 41. The record end signal causes the read address generating portion of the record signal process portion 39 to stop generating a read address. In addition, the signal causes the record current to stop flowing. Thereafter, the apparatus returns to the partial reproduction mode and determines whether or not to perform the after-recording. The above-described process is repeatedly performed.

(9) Example of block construction of recording portion

Figure 9:
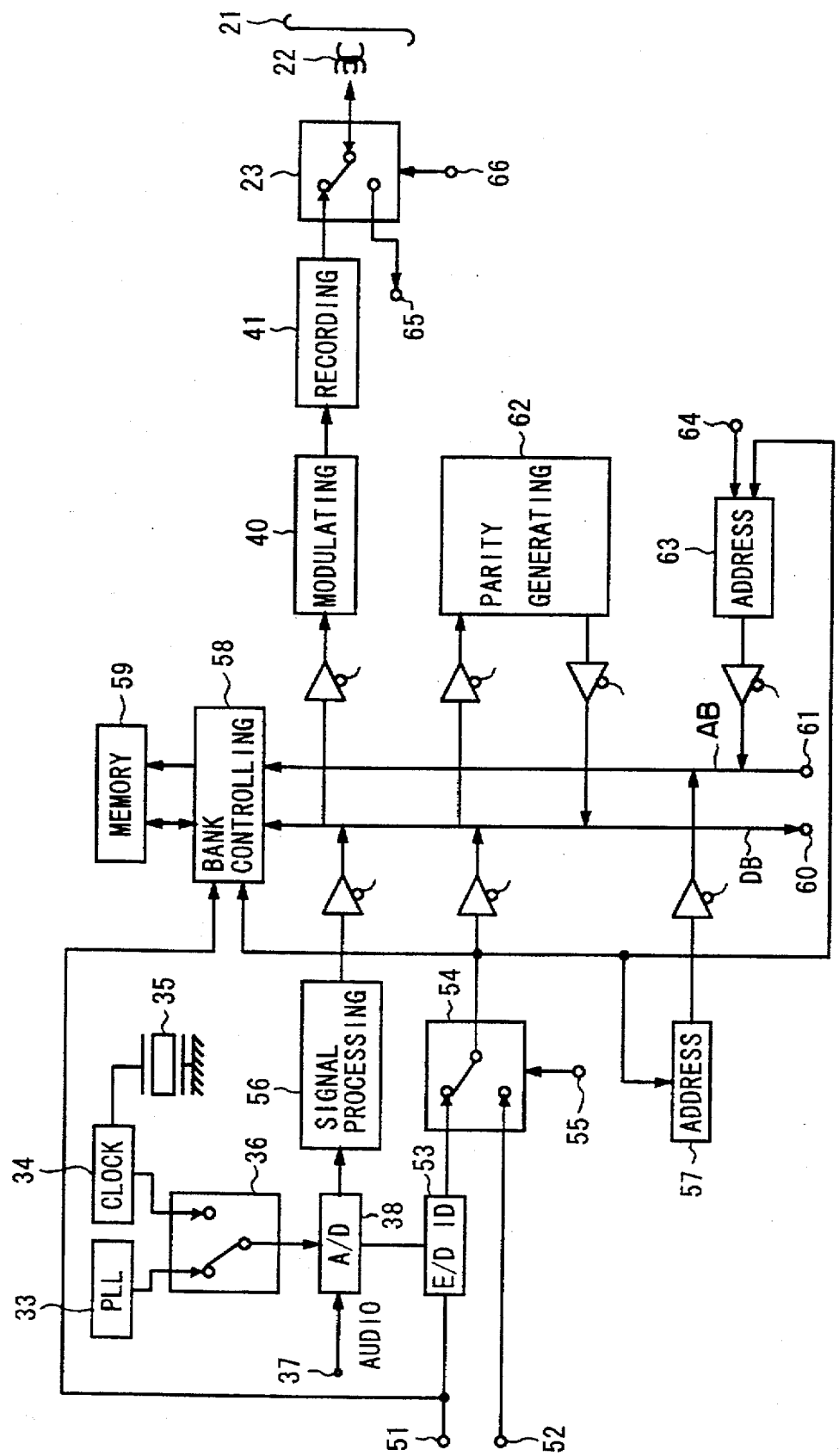
FIG. 9 is a block diagram showing a record signal process according to an embodiment of the present invention.

FIG. 9 is a block diagram showing an example of the internal construction of the record signal processing portion 39. As shown in the block diagram showing the basic construction, banks of a memory 59 are controlled by a memory bank controlling portion 58. A data bus DB and an address bus AB are connected to various signal processing portions. The data bus DB is connected to a block (not shown) through a terminal 60. Likewise, the address bus AB is connected to a block (not shown) through a terminal 61.

A sound (audio) signal is supplied from a terminal 37 to an A/D converting portion 38. The A/D converting portion 38 converts an analog signal into a digital signal. Either the clock supplied from the crystal oscillator 35 through the fs clock generating portion 34 or the clock generated by the fs clock generating PLL portion 26 corresponding to the detected E/D ID is used for the operating clock of the A/D converting portion 38. These clocks are switched by the selecting switch 36 corresponding to a control command issued from the system controller 29. In other words, two types of clocks are switched corresponding to a control command supplied from the system controller 29.

When the clock of the fs clock generating PLL portion 33 is selected in the after-record enable state, the same E/D ID as the E/D ID of the data portion that has been recorded is recorded along with the data. In the partial reproduction mode, the E/D ID that has been detected by the reproduction signal processing portion 26 is selected. The selected E/D ID is supplied to the data bus DB through an ID write buffer. At this point, the selecting switch 54 is switched corresponding to a control command received from the system controller 29 through a terminal 55. When the selecting switch 36 has selected the clock of the fs clock generating portion 34, a selecting switch 54 is controlled so that the E/D ID generated by the E/D ID generating portion 54 is recorded.

The E/D ID that has been selected by the selecting switch 54 is also supplied to an interleave address generating portion 57. The interleave address generating portion 57 controls an interleave address counter so as to determine the number of samples at one interleave region. The interleave address generating portion 57 generates a data write address and supplies it to the address bus AB through a write buffer.

Data that is output from the A/D converting portion 38 is converted into a byte type data sequence corresponding to the write address generated by the interleave address generating portion 57 so that the interleave signal processing portion 56 easily performs the interleave process. The resultant data is supplied to the data bus DB through a write buffer and written to the memory 59 that is controlled by the memory bank generating portion 58. Time shared data is supplied to a parity generating portion 62 through a buffer. The parity generating portion 62 generates a parity. The generated parity is supplied to the data bus through a parity write buffer and written to a predetermined region of the memory 59.

A read address generated by a read address generating portion 63 is supplied to the address bus AB through a read address buffer. Data written to the memory 59 is compressed on time axis and then read. The resultant data is input to the modulating portion 40 through a read data buffer. The modulating portion 40 modulates the input data suitable for high density magnetic recording.

The modulated data that is output from the modulating portion 40 is supplied to a recording amplifier 41. The amplifier 41 amplifies the input data. The amplified data is recorded at a predetermined record region on the magnetic tape shown in FIG. 6. When a partial reproduction mode command is received from the system controller, the operations of the read address generating portion 63 and the recording amplifying portion 41 are temporarily stopped. At this point, the recording/reproducing magnetic head selecting switch 23 is placed in the reproduction mode position. Thus, the apparatus enters the partial reproduction mode.

(10) Example of block construction of sampling clock controlling portion

Figure 10:
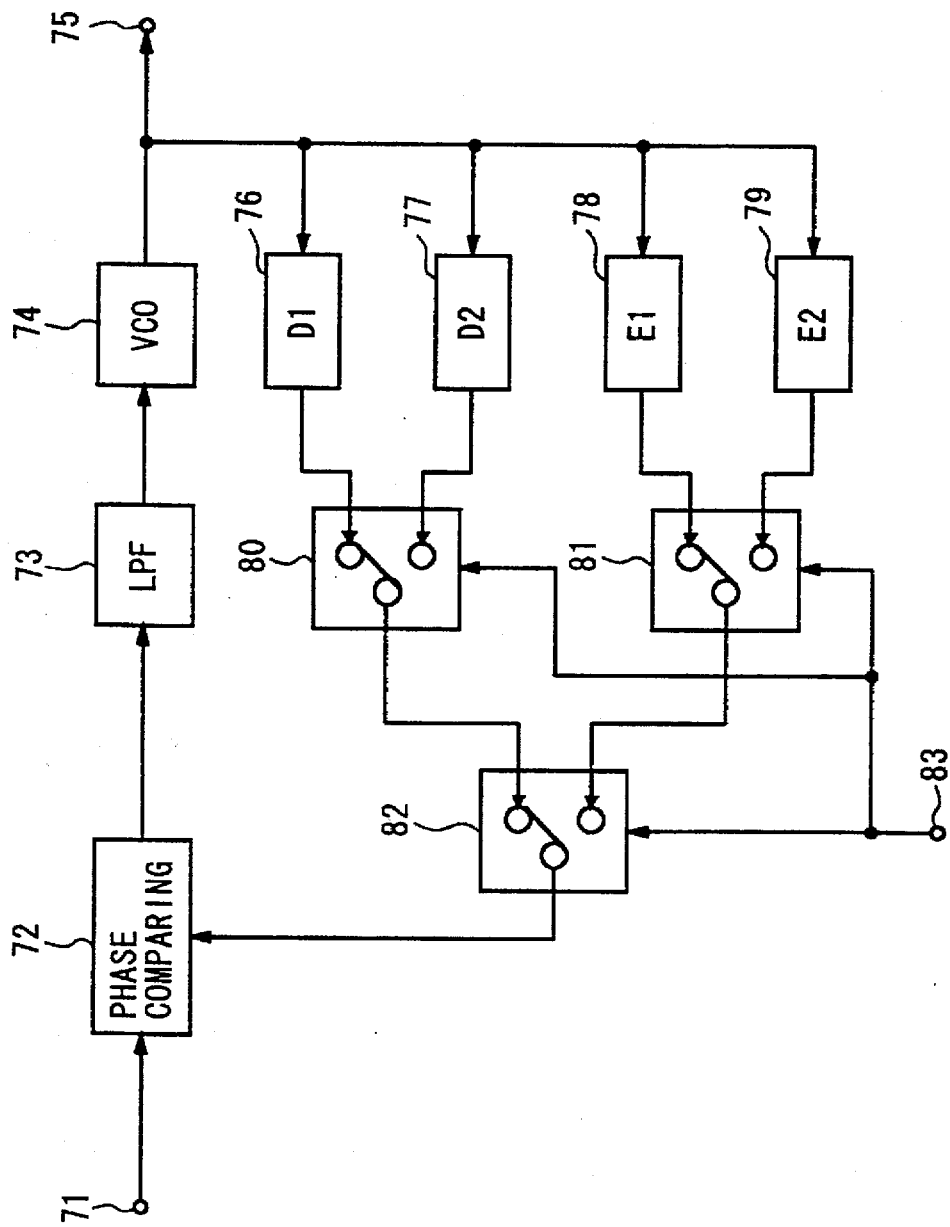
FIG. 10 is a block diagram showing a sampling clock controlling portion according to an embodiment of the present invention.

FIG. 10 is a block diagram showing an example of the construction of a sampling clock controlling portion. As described above, an ID signal is composed of two bits. In this embodiment, the construction thereof will be described with two parts. As a first part, the construction for determining either the number of E data (the number of E1 data and the number of E2 data) or the number of D data (the number of D1 data and the number of D2 data) will be described. As a second part, the construction for determining whether the number of samples (the number of D2 data (1582) and the number of E2 data (1622)) is farther from the standard number of samples (1602) or the number of samples (the number of D1 data (1592) and the number of E1 data (1612)) is closer to the standard number of samples (1602) will be described.

A frame reference signal FLID is supplied to a phase comparing portion 72 through an input terminal 71. The phase comparing portion 72 compares the phase of the frame reference signal FLID with the phase of one of the output signals of frequency dividers 76 to 79. The resultant signal is supplied to a low-pass filter 73 so as to control a VCO 74 on the next stage. An output signal of the VCO 74 is supplied to the A/D converting portion and so forth as the fs clock. In addition, the output signal of the VCO 74 is supplied to the frequency dividers 76 to 79. The fs clock supplied from the VCO 74 is output to the number-of-D1 data frequency divider 76 (1592), the number-of-D2-data frequency divider 77 (1582), the number-of-E1-data frequency divider 78 (1612), and the number-of-E2-data frequency divider 79 (1622).

The outputs of the number-of-D1-data frequency divider 76 and the number-of-D2-data frequency divider 77 are supplied to a selecting switch 80. The outputs of the selecting switch 80 are switched corresponding to the E/D ID supplied from a terminal 83. The E/D ID is composed of two bits. Likewise, the outputs of the number-of-E1-data frequency divider 78 and the number-of-E2-data frequency divider 79 are supplied to a selecting switch 81. The output of the selecting switch 81 is switched corresponding to the E/D ID supplied from a terminal 83. The selecting switches 80 and 81 operate in association with each other so that either smaller number of data (the number of D1 data and the number of E1 data) smaller than the standard number of samples or larger number of data (the number of D2 data and the number of E2 data) larger than the standard number of samples is selected.

The outputs of the selecting switches 80 and 81 are supplied to a selecting switch 82. The output of the selecting switch 82 is switched corresponding to the E/D ID supplied from a terminal 83. In other words, depending on the E/D ID supplied, either the number of E data or the number of D data is selected. The output of the selecting switch 82 is supplied to the phase comparing portion 72. The selecting switches 80, 81, and 82 for the frequency dividers use the E/D ID detected in the reproduction signal processing portion 26 shown in FIG. 8.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A digital signal recording apparatus, operable in an after-recording mode, for after-recording a digital information signal in an after-recording region of a recording medium already having data stored thereon, a frequency of data in an interleave region of said recording medium having a non-integer relationship with a sampling frequency of said digital information signal, said apparatus comprising:

means for identifying a number of samples of data already stored in an interleave region of said recording medium;

means for establishing, when said apparatus is in said after-recording mode, a number of samples of said information signal to be recorded in said after-recording region of said recording medium to equal the identified number of samples of data already stored in the interleave region; and recording means for recording an ID signal representing the number of samples of said information signal in the after-recording region of the recording medium along with the number of samples of said information signal.

2. The digital signal recording apparatus as set forth in claim 1, further comprising:

detecting means for detecting a sampling frequency and a number of quantizing bits of said data already recorded in the interleave region of said recording medium; and means for determining whether said information signal can be recorded in the after-recording region of the recording medium based on the detected sampling frequency and quantizing bits;

said recording means being operable to record said information signal only if said means for determining determines that said information signal can be recorded in the after-recording region.

3. The digital signal recording apparatus as set forth in claim 1, further comprising:

data record determining means for determining whether data already is recorded in a non after-record region of the recording medium;

error determining means for determining whether recording in said after-recording region would affect the data recorded in the non after-recording region when said data record determining means determines that data already is recorded in the non after-recording region; and sample number controlling means for controlling the number of samples to be recorded in one interleave region in the after-recording region to equal the number of samples in one interleave region in the non after-recording region.

4. The digital signal recording apparatus as set forth in claim 1, further comprising:

means for detecting an ID signal recorded on said recording medium identifying a number of samples recorded in one interleave region of a non after-recording region; and sample number controlling means for controlling a cumulative value of the number of samples of an input information signal to equal a cumulative value of the number of samples of an information signal to be recorded on a recording medium not having data recorded in a non after-recording region;

said recording means being operable to record the number of samples of the information signal controlled by said sample number controlling means and the detected ID signal identifying the number of samples.

5. The digital signal recording apparatus as set forth in claim 1, further comprising:

means for detecting an ID signal recorded on said recording medium identifying the number of samples in one interleave region of a non after-recording region of said recording medium;

sampling frequency determining means for determining a sampling frequency of the data to be recorded in the after-recording region from the detected ID signal;

means for recording a number of samples in said after-recording region equal to the number of samples recorded in one interleave region in the non after-recording region corresponding to the determined sampling frequency; and sample number controlling means for controlling a cumulative value of the number of samples of an input information signal to equal a cumulative value of the number of samples of an information signal to be recorded when data is not already recorded in the non after-recording region; and said recording means being operable to record the number of samples of the information signal controlled by said sample number controlling means and the ID signal identifying the number of samples.

6. The digital signal recording apparatus as set forth in claim 1, further comprising:

means for controlling a sampling clock used during data reproduction corresponding to an ID signal detected from said recording medium identifying the number of samples recorded in one interleave region in a non after-recording region of said recording medium; and means for causing the number of samples to be recorded in the after-recording region to equal a number of samples recorded in the non after-recording region;

said recording means being operable to record a second ID signal corresponding to the detected ID signal and an information signal in said after-recording region of the recording medium.

* * * * *